May 16, 1961  R. J. LEE  2,984,623
PERMEATION PROCESS USING IRRADIATED POLYETHYLENE MEMBRANE
Filed Oct. 22, 1956
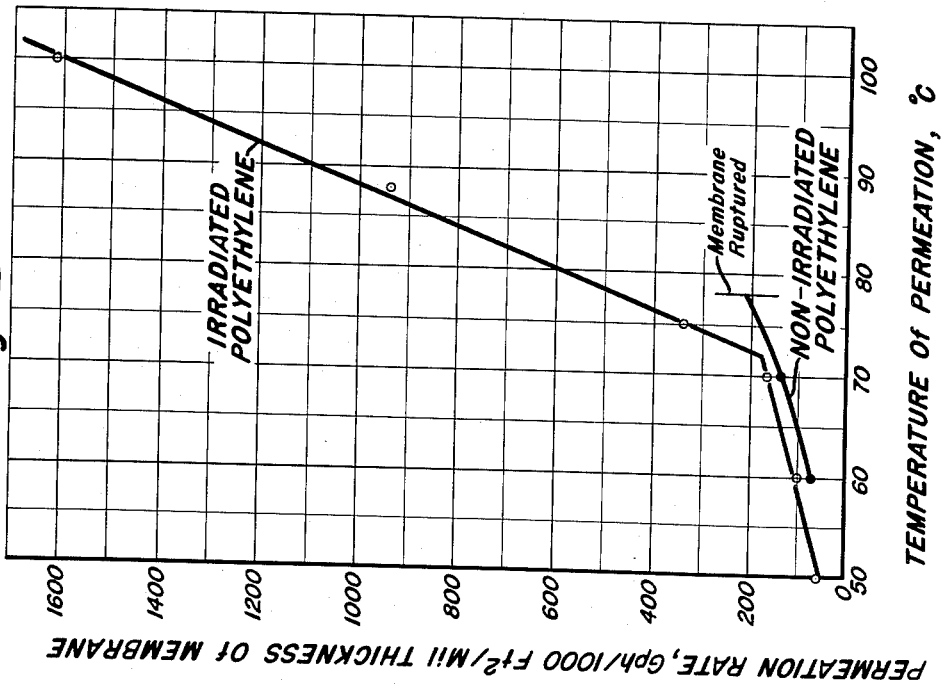
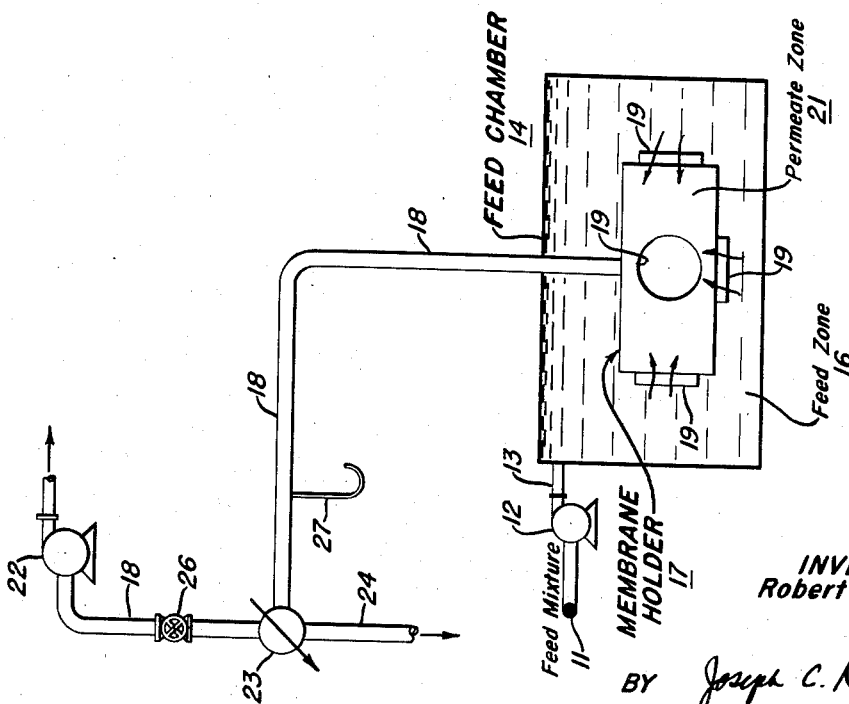
INVENTOR.
Robert J. Lee
BY Joseph C. Kotarski
ATTORNEY

2,984,623
PERMEATION PROCESS USING IRRADIATED POLYETHYLENE MEMBRANE

Robert J. Lee, La Marque, Tex., assignor, by mesne assignments, to Standard Oil Company, Chicago, Ill., a corporation of Indiana Filed Oct. 22, 1956, Ser. No. 617,609
5 Claims. (Cl. 210—23)

This invention relates to the separation of components contained in a liquid mixture by permeation through plastic membranes, and in particular it concerns the use of irradiated polyethylene membranes.

This invention is based upon the discovery that by employing irradiated polyethylene membranes the permeation process can be carried out at a higher temperature with an unexpectedly high increase in permeation rates without causing the membrane to rupture; whereas if non-irradiated polyethylene is used at permeation temperatures of above about 75° C., the membrance ruptures.

In accordance with the invention an irradiated polyethylene membrane is employed as the plastic membrane in a permeation apparatus. The polyethylene is that which has been subjected to an irradiation dosage level sufficient to cause cross-linking of the polymer and thus improve its temperature stability and resistance to solvents but not to that dosage level which causes degradation of the polyethylene. A dosage level of about 1 to 200, suitably 10 to 100, megaroentgens per sq. cm. of membrane surface is satisfactory. In the permeation process a mixture of compounds which are permeable through the membrane can be separated by taking advantage of their differing solubilities within the membrane and their differing permeation rates through the membrane; the compound which is more soluble in the membrane being contained in the mixture which has permeated through the membrane in a higher concentration than in the initial mixture. The mixture which is to be separated—it may be a mixture of organic chemicals, a mixture of hydrocarbons, a mixture of water and an organic chemical, etc.—is introduced into the feed zone of the permeation apparatus. It is there maintained in the liquid state. A portion of the mixture is permeated through the membrane and into the permeate zone where it exists in the form of vapors. The pressure in the feed zone should be sufficient to maintain the mixture undergoing separation in the liquid phase. The pressure in the permeate zone should be such that the permeated mixture is maintained in the vapor phase, sub-atmospheric pressure being preferred. Since the rate of permeation of the mixture increases with increasing temperature, the higher operating temperatures e.g. 75° to 200° C. are preferred. The rate of permeation is increased by 10 to 20 fold by using the irradiated polyethylene under higher permeation operating temperatures in place of conventional polyethylenes under permeation operating temperatures which are the maximum that the latter material can withstand without rupturing.

The permeation process is capable of separating small molecules of less than colloidal size because of the difference of solubility and rates of permeation of the molecules in and through the plastic membrane. The permeation process thus differs from dialysis wherein molecules of less than colloidal size are selectively permeated through a membrane whereas molecules of colloidal size do not permeate through the membrane in any amount (hence the term semi-permeable membrane used in dialysis).

A great variety of vaporizable mixtures can be separated in the permeation process employing an irradiated polyethylene membrane. Mixtures of organic compounds such as organic chemicals, hydrocarbons and the like can be separated. Hydrocarbons can be separated by type and/or molecular configuration. Of the different types of hydrocarbons, aromatic hydrocarbons permeate more rapidly than olefinic or diolefinic compounds which in turn permeate more rapidly than saturated hydrocarbons. Of the various saturated hydrocarbons, straight chain paraffins permeate more rapidly than cyclic paraffins which in turn permeate more rapidly than branched-chain paraffins, when the hydrocarbons have approximately the same boiling point. The branched chain hydrocarbons which have a lesser degree of branching will permeate more rapidly than the branched chain paraffins having a greater amount of branching. Since the higher molecular weight hydrocarbons permeate somewhat more slowly than the lower molecular weight hydrocarbons, the permeation process is more advantageously applied to hydrocarbon mixtures which do not have too wide a boiling range; narrow boiling mixtures e.g. boiling within a range of about 30° C. enable a rather high degree of separation to be obtained per stage. Petroleum fractions, oils obtained from the coking or hydrogenation of coals etc. are suitable feed stocks. Gasoline boiling range petroleum fractions, either virgin or catalytically converted fractions such as naphtha reformate fractions, are very satisfactory feed stocks to the permeation process for separation or concentration of the desired components contained therein.

Organic chemicals can be separated from each other or from hydrocarbons or from water. As has been stated previously the component of the mixture which is more soluble in the membrane will generally permeate the membrane more rapidly and will be present in the permeated mixture in a higher concentration than in the initial mixture. Those components which more closely resemble polyethylene tend to be more soluble in it and permeate through it more rapidly. Hydrophobic compounds thus generally permeate more rapidly than hydrophilic compounds. For these reasons, hydrocarbons will generally permeate through the membrane more rapidly than organic chemicals. For example benzene, hexane etc. will permeate more rapidly than ethanol, acetic acid, ethyl acetate or the like. The same considerations govern the separation of a mixture of organic chemicals i.e. the more hydrophobic and the more similar the chemical is to polyethylene or hydrocarbons, the more rapidly will the organic chemical permeate through the membrane. For example ethyl acetate will permeate the polyethylene membrane more rapidly than ethanol, and carbon tetrachloride will permeate the polyethylene membrane more rapidly than either of the aforementioned compounds. Since water is radically unlike polyethylene in that it is far remote from a hydrocarbon in properties and is the most hydrophilic substance, it will permeate less rapidly than any organic chemical compound and will remain in the non-permeated fraction when mixtures containing water are permeated through the polyethylene membrane. The mixtures to be separated may contain widely varying amounts of their individual components. Azeotropic mixtures are very suitable feed stocks which may be processed to recover the purified individual components.

In carrying out the permeation process the feed mixture to be separated is introduced into the feed zone of the permeation apparatus. The permeation apparatus is comprised essentially of the irradiated polyethylene membrane which separates the feed zone from the permeate zone. The mixture in the feed zone cannot pass through to the permeate zone except by permeation through the membrane. Because of differences in solubility and permeation rates of the components of the feed mixture in and through the membrane, the permeated mixture will be enriched in the component of the feed mixture which is more soluble in the membrane. The non-permeated fraction will be depleted in this component and enriched in the remaining component(s). The feed mixture is maintained in the liquid phase by suitable adjustment of temperature and/or pressure. The permeated mixture is maintained in the vapor state by the proper adjustment of temperature and/or pressure. The feed mixture may be continuously or intermittently introduced into the feed zone and the permeated mixture is preferably continuously removed from the permeate zone. Non-permeated portion may also be continuously or intermittently withdrawn from the permeation apparatus. In order to obtain a separation of the feed mixture into its components, it is of course essential that only a portion of the feed mixture be permeataed through the membrane. From as little as 5 to as much as 95% of the feed may be permeated, depending upon the relative concentrations of the components in the feed, the extent of purity desired, the specific components contained in the mixture, etc. A number of permeation stages may be used.

The pressure in the feed zone is adjusted so that at the permeation operating temperature, the feed mixture is maintained in the liquid state. Thus a pressure in the feed zone of from atmospheric to 100–500 p.s.i.g. may be used. While the permeate zone is operated at a pressure such that the permeated mixture is in the vapor state under the particular operating temperatures used, it is preferred to maintain the permeate zone at a sub-atmospheric pressure since a greater degree of separation is thereby attained. While maintenance of the feed mixture in the liquid phase while in contact with the membrane increases the likelihood of rupture of the membrane, much higher permeation rates are obtained thereby than if the feed mixture were in the vapor phase.

The polyethylene membrane which is employed is one which has been subjected to irradiation. The dosage level to which the polyethylene is irradiated is that sufficient to cause cross-linking of the polymer and consequent improvement in temperature stability and resistance to the solubilizing action of solvents. The dosage level must not be so high as to cause any substantial degradation of the polymer. A dosage level of between about 10 and 100 megaroentgens/sq. cm. is satisfactory. Any of the conventional irradiation means can be used such as gamma rays from cobalt 60, spent fuel elements, cesium 137 or beta rays such as are produced by particle acceleration, e.g. Van de Graaff accelerators, resonant transformer units, linear accelerators etc. The beta-ray irradiation technique is usually preferred. Whereas non-irradiated polyethylene will rupture at about 75° C. or thereabouts when used in permeating a liquid mixture, irradiated polyethylene can be used at temperatures as high as 150° to 200° C. or even higher without rupturing of the membrane. Since the rate of permeation is higher at higher permeation operating temperatures, much greater rates of permeation or throughput per given area of membrane surface can be obtained by using the irradiated polyethylene membrane. For example, when using non-irradiated polyethylene for the permeation of a mixture of hydrocarbons, the maximum rate of permeation is about 200–300 gallons per hour/thousand sq. ft. of membrane surface/mil thickness of membrane (for at higher temperatures which would be needed to obtain higher permeation rates the membrane ruptures). However, when using irradiated polyethylene, permeation rates on the order of 1800 gallons/hour/1000 sq. ft. of membrane surface/mil thickness of the membrane and even higher rates are obtained without rupturing of the membrane. The improvement in permeation rates is obtained without apparent loss of selectivity, and in certain instances it has been noted that the irradiated polyethylene is even more selective than the non-irradiated polyethylene. Commercial polyethylene such as may have molecular weight on the order of 5,000–40,000 and which may or may not contain added ingredients such as antioxidants or the like, can be irradiated to form the membranes employed. Since higher permeation rates are obtained at the higher permeation operating temperatures, it is preferred to employ these higher temperatures, i.e., higher than about 75° C.

Since the rate of permeation increases as the thickness of the membrane decreases, it is desirable to employ very thin membranes of the order of 0.1 to 5 mils, usually on the order of 0.5 to 1 mil or thereabouts. The membrane must be free of any pin holes, tears, etc. which would destroy the continuity of membrane surface; for the presence of pin holes and the like would allow the liquid mixture to pass through in gross amounts and destroy selectivity.

The invention will be more clearly understood from the following description and accompanying drawings.

Figure 1 diagrammatically represents a form of the apparatus used in practicing the invention on a laboratory scale.

Figure 2 graphically illustrates tabulated data from Table I.

Figure 1 is now described in more detail. Feed from source 11 is pumped by way of pump 12 through line 13 into feed chamber 14. Pump 12 is operated at a pressure to maintain the feed mixture in line 13 and in feed zone 16 in the liquid phase. The absolute pressure in line 13 and in feed zone 16 is determined by pressure measuring devices not shown herein. Membrane holder 17 is positioned within feed chamber 14 and has a box-type design with a circular opening in each of 5 of its faces. A threaded brass ring surrounds each opening and extends outwardly from the plane of the surface of the membrane holder to form a cylindrical extending threaded wall with a flat shoulder. A fine mesh screen wire is supported and soldered across each opening and then the membrane is placed over each of the openings. A knurled brass ring fitting threaded on the inside is then used to seal the membrane to the shoulder of the cylindrical wall and thus form a leak proof seal so that the feed mixture can only enter into the interior of the membrane holder by permeating through the membrane. A line 18 is attached to the top face of membrane holder 17 for the withdrawal of the permeated mixture which permeates from the feed zone 16 through membrane 19 into permeate zone 21. A sub-atmospheric pressure is maintained in line 18 and permeate zone 21 by means of vacuum pump 22. The permeated mixture is removed in the vapor state from permeate zone 21 by means of line 18 and passed through an acetone-Dry Ice condenser 23 wherein the permeated mixture is liquefied and removed by way of line 24. Needle valve 26 and manometer 27 are positioned in line 18 to assist in regulating and measuring the absolute pressure in line 18 and permeate zone 21.

A number of experiments were carried out using the above-described laboratory apparatus. Permeation experiments using irradiated and non-irradiated polyethylene membranes were carried out. The experimental technique consisted of introducing the liquid feed mixture into the feed zone of the permeation apparatus at the desired temperature. The feed mixture was maintained in the liquid phase in the feed zone. The pressure in the feed zone in various experiments ranged from atmospheric up to super-atmospheric pressures of about 150–200 p.s.i.g., the pressure in the feed zone being sufficient to maintain the feed mixture in the liquid state. The permeate zone was maintained at an absolute pressure between about 35–40 mm. Hg. In carrying out the experiments, the permeation runs were begun and allowed to line out before measurements of the permeation rate and composition of the permeate were made. The irradiated and non-irradiated polyethylene membranes employed had a thickness usually of 1.0 to 2.0 mils. Since the permeation rate in all instances was calculated based upon a one mil thickness of the membrane, the variation in rate due to membrane thickness was eliminated and permeation rates are expressed in a manner based upon a standard membrane thickness.

In the first series of experiments which is shown in Table I which follows, equivolume mixtures of methylcyclohexane and isooctane or equivolume mixtures of n-heptane and isooctane were employed as feed mixtures in the permeation runs. Runs 1-6 were carried out employing an irradiated polyethylene membrane (Irrathene 101-15) which had been irradiated to a dosage level of 15 megaroentgens per sq. cm. of membrane surface area. Runs were carried out at temperatures varying from 50° C. up to 101° C. using the irradiated polyethylene membrane and the rates of permeation were determined in gal./hr./1000 sq. ft. of membrane surface/mil thickness of membrane. The permeate composition was determined. In runs 7-9 non-irradiated polyethylene (the same polyethylene material as was employed in making the irradiated polyethylene) was employed as the membrane in permeation experiments carried out at 60° to 78° C. The results obtained are shown in Table I which follows:

Table I

| Run No. | Polyethylene Membrane | Feed Composition [1] | Permeate Composition | Permeation Temp., °C. | Permeation Rate [2] |
|---|---|---|---|---|---|
| 1 | Irradiated | 50% MCH / 50% I | | 50 | 55. |
| 2 | do | 50% MCH / 50% I | | 60 | 100. |
| 3 | do | 50% MCH / 50% I | | 70 | 165. |
| 3a | do | 50% MCH / 50% I | 57% MCH / 43% I | 100 | 1,800. |
| 4 | do | 50% H / 50% I | 60% H / 40% I | 75 | 337. |
| 5 | do | 50% H / 50% I | 58% H / 42% I | 88 | 944. |
| 6 | do | 50% H / 50% I | 57% H / 43% I | 101 | 1,620. |
| 7 | Non-Irradiated | 50% MCH / 50% I | 54% MCH / 46% I | 60 | 73. |
| 7a | do | 50% MCH / 50% I | | 70 | membrane ruptured. |
| 8 | do | 50% H / 50% I | 59% H / 41% I | 70 | 138. |
| 9 | do | 50% H / 50% I | | 78 | membrane ruptured. |

[1] Symbols: MCH=methylcyclohexane; I=isooctane; H=n-heptane.
[2] In terms of gal./hr./1,000 sq. ft. membrane surface/mil thickness of membrane.

The tabulated data which appear above, exclusive of runs 3a and 7a, are graphically presented in Figure 2. It is readily apparent from Figure 2 that the irradiated polyethylene can be used at much higher temperatures than the non-irradiated polyethylene and that much higher permeation rates are obtained. Non-irradiated polyethylene cannot be used at temperatures in excess of about 75°-78° C. since the membrane ruptures at about that temperature when used in the permeation process wherein the feed contacts the polyethylene membrane in the liquid phase. Irradiation of the polyethylene increases its temperature stability and apparently makes it more resistant to solvents although it does not reduce the rate of permeation nor appreciably affect the selectivity as evidenced from the runs in Table I. It should also be noted that at a permeation temperature of about 70°-75° C., the rate of change of permeation rate which change in temperature increases drastically, i.e., an increase of 10° C. in the permeation operating temperature above 75° C. provides a greater percentage increase in permeation rate than does the 10° C. increase below 75° C. The reason for this unexpectedly beneficial result is not understood, but it is felt that the irradiation of the polyethylene in some manner contributes to it. Strikingly, the benefit seems to arise at a permeation temperature of about 70°-75° C.

A series of runs was carried out which shows the effect of radiation dosage upon the permeation rate and the selectivity of the irradiated polyethylene membrane. In these experiments an equivolume mixture of methylcyclohexane and isooctane was employed as the feed mixture. The operating techniques and conditions used were those which have been described previously. Polyethylene membranes which had been irradiated from the zero level up to 100 megaroentgens/sq. cm. of membrane surface were employed in the permeation experiments. The irradiated polyethylene membranes were Irrathene 201-15, Irrathene 201-50 and Irrathene 201-100. The Irrathene 201 series of irradiated polyethylene membranes contained a small amount of anti-oxidant to improve stability and stress-cracking resistance. The results obtained are shown in Table II which follows:

Table II

| Run No. | Membrane Radiation Dosage, Megaroentgens/sq. cm. | Permeation Temp., °C. | Permeation Rate | Percent MCH In Permeate |
|---|---|---|---|---|
| 10 | None | 60 | 73 | 54 |
| 11 | None | 80 | Membrane Ruptured | |
| 12 | 15 | 100 | 1800 | 57 |
| 13 | 50 | 101 | 1800 | 54 |
| 14 | 100 | 101 | 1560 | 57.5 |

There appears to be no important variation in the permeation rate (at a given temperature) with a variation in the radiation dosage rate within the dosage limits shown. Similarly, a variation of the dosage level did not appear to effect greatly the selectivity, although it can be seen that the selectivity is improved over that obtained with non-irradiated polyethylene membrane.

Table III which follows provides examples of separation by permeation of other hydrocarbon mixtures. The operating techniques and conditions used were those described previously. In runs 15 and 16, mixtures of cyclohexane and 2,4-dimethylpentane, were employed as the feed mixture. In runs 17 and 18, equivolume mixtures of benzene and cyclohexane were employed as the feed mixtures. Comparative experiments were carried out using non-irradiated and irradiated polyethylene (Irrathene 201-15 and Irrathene 101-15). The irradiated polyethylene were irradiated to a dosage level of 15 megaroentgens/sq. cm. The results obtained in these experiments are shown in Table III which follows:

Table III

| Run No. | Polyethylene Membrane | Permeation Temp., °C. | Composition, Vol. Percent | | Permeation Rate [2] |
|---|---|---|---|---|---|
| | | | Feed [1] | Permeate | |
| 15 | Non-Irradiated | 70 | 50% CH / 50% 2,4-DMP | 50% CH / 50% 2,4-DMP | 222 |
| 16 | Irradiated (15 megaroentgens) | 80 | 48% CH / 52% 2,4-DMP | 53% CH / 47% 2,4-DMP | 830 |
| 17 | Non-Irradiated | 80 | 50% B / 50% CH | Membrane Ruptured | |
| 18 | Irradiated (15 megaroentgens) | 80 | 50% B / 50% CH | 55% B / 45% CH | 750 |

[1] Symbols: CH=cyclohexane; 2,4-DMP=2,4-dimethylpentane; B=Benzene.
[2] In terms of gal./hr./1,000 sq. ft. membrane surface/mil thickness of membrane.

It will be noted from run No. 16 that the irradiated polyethylene displayed a preference for permeating cyclohexane rather than 2,4-dimethylpentane. However, run No. 15 shows that non-irradiated polyethylene displays no selectivity whatsoever for either component of the feed mixture i.e. the composition of the permeate is the same as the composition of the feed.

The separation of organic chemicals from water was demonstrated in experiments using an irradiated polyethylene membrane. Various mixtures of pyridine and water were permeated through irradiated polyethylene membrane (Irrathene 201–15). The polyethylene membrane was two mils in thickness and had been subjected to a radiation dosage level of about 15 megaroentgens/sq. cm. of surface. Super-atmospheric pressures up to about 150–200 p.s.i.g. were maintained in the feed zone in order to keep the feed mixture in the liquid phase, since the components of the feed mixtures would exist as vapors at the permeation temperatures employed if atmospheric pressures were used in the feed zone. The permeate zone was maintained at 35 mm. Hg absolute. The permeation rates and compositions of the feed mixture and permeate were determined and are shown in Table IV which follows:

*Table IV*

| Run No. | Pyridine-Water Composition, Wt. Percent Pyridine | | Temp., °C. | Permeation Rate, Lbs./Hr./1,000 sq. ft. Membrane Surface |
|---|---|---|---|---|
| | Feed | Permeate | | |
| 19 | 50 | 90 | 96 | 100 |
| 20 | 49.7 | 88 | 121 | 720 |
| 21 | 49.2 | 86 | 130 | 780 |
| 22 | 48.6 | 86 | 140 | 1,040 |
| 23 | 47.9 | 77 | 150 | 2,190 |

The high rate of permeation and the high degree of separation is evident from the above data. Whereas non-irradiated polyethylene would rupture at a temperature of 80° C. or higher, irradiated polyethylene was employed at temperatures of 150° C. Permeation rates which were 20 fold higher than could be obtained with non-irradiated polyethylene were thus possible. Even higher temperatures can be employed and consequently even greater rates of permeation can be obtained by use of the irradiated polyethylene membranes.

While the invention has been described with reference to certain specific examples, the invention is not to be considered as limited thereto but includes within its scope such modifications and variations as would occur to one skilled in the art.

What is claimed is:

1. In a permeation process wherein a liquid mixture of at least two compounds, which compounds permeate at different rates through a plastic membrane, is separated by contacting the liquid mixture in the feed zone of a permeation apparatus with one side of a plastic membrane in which one of the components of the mixture is more soluble than another, permeating a portion of the mixture through the membrane and removing from the opposite side of the membrane into the permeate zone vapors of the permeated mixture enriched in the component more soluble in the membrane, the improvement which comprises employing as said membrane a polyethylene membrane which has been irradiated at a dosage level between about 1 and 200 megaroentgens/sq. cm. of membrane surface and carrying out the permeation process at a temperature above about 75° C.

2. The process of claim 1 in which the polyethylene is irradiated at a dosage level between about 10 and 100 megaroentgens/sq. cm. of membrane surface.

3. The process of claim 1 wherein a mixture of organic chemicals is separated.

4. The process of claim 1 wherein a mixture of water and an organic chemical is separated.

5. The process of claim 1 in which the liquid mixture undergoing separation is a mixture of hydrocarbons.

References Cited in the file of this patent

UNITED STATES PATENTS

| 2,386,826 | Wallach et al. | Oct. 16, 1945 |
| 2,475,990 | Robertson | July 12, 1949 |

OTHER REFERENCES

Transactions of Electrochemical Society, vol. 90, pages 352, 353 (1947). (Article by A. E. Maibauer and C. D. Myers.)

Chemical Engineering for September 1955, page 228. (Article by F. J. Bockhoff and J. A. Neumann.)

Simril et al.: "Modern Plastics," vol. 27, No. 10, June 1950, pages 97, 98, 100, 102, 150–152, 154, 156 and 158.

Modern Plastics, April 1954, pages 100, 101 and 219.

Charlesby: "Nucleonics," June 1954, vol. 12, No. 6, June 1954, pages 18–25.